United States Patent
Tian et al.

(10) Patent No.: US 10,203,966 B2
(45) Date of Patent: Feb. 12, 2019

(54) APPLICATION LAUNCHER AND MANAGEMENT FRAMEWORK FOR A NETWORK DEVICE

(71) Applicant: AVAGO TECHNOLOGIES INTERNATIONAL SALES PTE. LIMITED, Singapore (SG)

(72) Inventors: Geng Tian, Cupertino, CA (US); James J. Chen, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 44 days.

(21) Appl. No.: 15/337,759

(22) Filed: Oct. 28, 2016

(65) Prior Publication Data
US 2018/0062922 A1    Mar. 1, 2018

Related U.S. Application Data

(60) Provisional application No. 62/380,211, filed on Aug. 26, 2016.

(51) Int. Cl.
| | |
|---|---|
| *G06F 15/173* | (2006.01) |
| *G06F 9/445* | (2018.01) |
| *G06F 9/46* | (2006.01) |
| *G06F 11/07* | (2006.01) |
| *H04L 29/08* | (2006.01) |

(52) U.S. Cl.
CPC ............ *G06F 9/44505* (2013.01); *G06F 9/46* (2013.01); *G06F 11/07* (2013.01); *H04L 67/20* (2013.01)

(58) Field of Classification Search
USPC ................................ 709/220, 223, 224, 222
See application file for complete search history.

(56) References Cited

U.S. PATENT DOCUMENTS

| | | | | |
|---|---|---|---|---|
| 5,629,609 | A | * | 5/1997 | Nguyen .................. G05F 1/575 323/269 |
| 8,867,552 | B2 | | 10/2014 | Vobbilisetty et al. |

(Continued)

OTHER PUBLICATIONS

"Open and Programmable," Arista, Retrieved from Internet:https://www.arista.com/en/products/eos/open-and-programmable, printed on Dec. 15, 2016, Copyright © 2016 Arista Networks, Inc. 3 pages.

(Continued)

*Primary Examiner* — Liang Che A Wang
(74) *Attorney, Agent, or Firm* — Xsensus/Broadcom

(57) ABSTRACT

An application launcher and management framework (ALM framework) is provided for enabling and managing the execution of external applications (e.g., third party applications) on a network device. The ALM framework enables external applications to be executed and managed on a network device based upon configuration information specified for the external applications. In certain embodiments, the ALM framework enables an external application to be executed within the network device's network operating system (NOS) as if the application was provided as part of the NOS. By enabling the external application to be integrated with the network device's NOS, the ALM framework enables several services provided by the NOS to be made available to the external application.

15 Claims, 4 Drawing Sheets

(56) References Cited

U.S. PATENT DOCUMENTS

| | | | | |
|---|---|---|---|---|
| 2007/0192863 A1* | 8/2007 | Kapoor | .................. | G06F 9/505 |
| | | | | 726/23 |
| 2010/0138515 A1* | 6/2010 | Ruiz-Velasco | .......... | G06F 9/445 |
| | | | | 709/217 |
| 2012/0240185 A1* | 9/2012 | Kapoor | ............... | H04L 63/1425 |
| | | | | 726/1 |
| 2014/0359354 A1* | 12/2014 | Havemose | .......... | G06F 11/1438 |
| | | | | 714/15 |
| 2017/0255583 A1* | 9/2017 | Shih | .................... | G06F 13/4022 |

OTHER PUBLICATIONS

"Arista EOS: Smart System Upgrade," Arista, White Paper, 8 pages, Copyright © 2014 Arista Network, Inc.

"Customizing EOS CLI—Parser 101," Arista, printed from www.arista.com on Dec. 15, 2016, 5 pages.

"Arista at-a-glance: Data Center Class: Extensible Operating System," Arista Network Operating System Extensibility, Jan. 2010, 2 pages.

"EOS: The Next Generation Extensible Operating System," Arista, White Paper, 8 pages, Copyright © 2016 Arista Network, Inc.

"EOS: The Platform for Software Driven Cloud Networking," Arista Cloud Networking Portfolio, printed from www.arista.com on Dec. 5, 2016, 2 pages.

\* cited by examiner

APPLICATION LAUNCHER AND MANAGEMENT FRAMEWORK FOR A NETWORK DEVICE

CROSS-REFERENCES TO RELATED APPLICATIONS

The present application is a non-provisional of and claims the benefit and priority of U.S. Provisional Application No. 62/380,211, filed Aug. 26, 2016, entitled APPLICATION LAUNCHER AND MANAGEMENT FRAMEWORK FOR A NETWORK DEVICE, the entire contents of which are incorporated herein by reference for all purposes.

BACKGROUND

The present disclosure relates to networking. More particularly, a framework is described for managing the execution of external applications (e.g., third party applications) on a network device.

Conventionally, network devices were "closed" in that they did not allow external applications (e.g., third party applications (TPAs) that are developed by third parties and not by the provider of the network device) to be executed on a network device. More recently, some network devices have opened up slightly in that some external applications can be executed by a network device. However, these external applications are not integrated with the network device's operating system (sometimes referred to as the network operating system or NOS) that is responsible for the network device's functionality. This lack of integration leads to several problems. For example, while an external application can be executed on a network device, there is typically no way for a user of the network device to recover the application if the application crashes/terminates unexpectedly or becomes non-responsive.

As another example, many conventional network devices provide features for increasing the availability of the network devices. For example, a network device may provide redundant management modules to provide for high availability (HA) of the network device. During normal operations of the network device, one of the two management modules operates in active mode while the other operates in standby mode. Upon a failover, which may, for example, occur due to something going wrong on the active management module, the standby module becomes the active module and the previously active module may become the standby module. In this manner, by providing redundant modules, the functions performed by the network device can be performed uninterrupted. An external application may be loaded and executed by the active module, but when a failover occurs, that application is gone. There is no way to automatically restart the application on the new active module after the failover.

As yet another example, in a conventional network device, the NOS of the network device is unaware of external applications. As a result, the entire responsibility of loading and launching an application is on the user of the application. The user of the application has to manually attend to loading, launching, and management of the application.

BRIEF SUMMARY

The present disclosure relates generally to networking technologies, and more particularly to a framework for managing the execution of external applications (e.g., third party applications) on a network device.

An application launcher and management framework (ALM framework) is provided for enabling and managing the execution of external applications (e.g., third party applications) on a network device. The ALM framework enables external applications to be executed and managed on a network device based upon configuration information specified for the external applications. In certain embodiments, the ALM framework enables an external application to be executed within the network device's network operating system (NOS) as if the application was provided as part of the NOS. By enabling the external application to be integrated with the network device's NOS, the ALM framework enables several services provided by the NOS to be made available to the external application.

In certain embodiments, configuration information may be specified for an external application that specifies one or more actions to be taken based upon the state of the external application and/or the state of the network device. The ALM framework is configured to monitor the state of the executing external application and of the network device and take appropriate actions for the external application as specified by the configuration information associated with the external application.

In certain embodiments, a network device may comprise a set of one or more processors and a set of ports for receiving or forwarding packets from the network device. A first processor from the set of processors may be configured to execute a first process. The first process may receive information identifying an application to be executed by the network device and also receive configuration information for the application, where the configuration information identifies a condition for launching the application. The condition may, for example, be related to a particular state of the network device. The first process may monitor the network device and determine if the condition is satisfied. Upon determining that the condition is satisfied, the first process may cause the application to be executed by the network device.

The condition may be based upon any one of multiple states of the network device. Examples of these states include without limitation a state of a command line interface (CLI) of the network device (e.g., whether CLI is ready or not), a state related to the one or more ports of the network device (e.g., are the ports enabled or not), a state related to whether the network device is operating in a stable state; a state indicative of whether the network device is going through a power down sequence, a state related to a failover, and various other states of the network device.

In certain embodiments, the configuration information for an application may identify a first action to be performed when the application enters a first application state. In one such embodiment, the first process executed by the network device may be configured to monitor the application executed by the network device, determine when the application has entered the first application state, and responsive to determining that the application has entered the first application state, cause the first action to be performed. For example, the first application state may be a state where the application is non-responsive or has crashed or terminated unexpectedly, and the first action may be to restart the application on the network device.

In certain embodiments, the configuration information for an application may identify a second action to be performed when a first state is associated with the network device. In one such embodiment, the first process executed by the network device may be configured to monitor one or more states of the network device to determine if the first state is associated with the network device, and responsive to determining that the first state is associated with the network device, cause the second action to be performed. For example, the first state associated with the network device may be a state indicating that the network device is going through a power down sequence, and the second action may be to write information (e.g., flush information) for the application to a persistent memory of the network device. In this manner, the application may be gracefully terminated prior to the power down.

In certain embodiments, the configuration information for an application may identify a third action to be performed when a second state is associated with the network device. A second processor from the set of processors of the network device may be configured to execute a second process. The second process may determine that the second state is associated with the network device and, responsive to determining that the second state is associated with the network device, cause the third action to be performed by the network device. For example, the first processor executing the first process may be part of a first management module and the second processor executing the first process may be part of a second management module. Initially, the first management module maybe the active management module and the second management module may be the standby management module. When a failover occurs causing the second management module to become the active management module, the second management module may execute a second process. The second process may determine that a failover has occurred and may launch the application on the second management module.

Various different techniques may be used for providing information identifying an application and its associated configuration information to a network device. Techniques include without limitation via a command line interface (CLI) provided by the network device, via HTTP requests/interfaces, and the like.

In certain embodiments, a network device may comprise a first management module operating in a first mode (e.g., active mode), where the first management module performs a set of functions when operating in the first mode. The network device may comprise a second management module operating in a second mode (e.g., standby mode), where the second management module does not performing the set of functions when operating in the second mode. The first management module may execute a first process (e.g., ALM daemon) that is capable of determining configuration information for an application, the configuration information identifying a set of one or more conditions to be satisfied for launching the application on the network device. The first process may determine that each condition of the set of one or more conditions is satisfied, and, responsive to determining that each condition of the set of one or more conditions is satisfied, causing the application to be executed by the first management module of the network device. The set of conditions could include various different conditions such as, for example, a condition related to a state of the network device. The first process may be configured to monitor the state of the executing application and one or more states of the network device.

In certain embodiments, the configuration information for an application may indicate that the application is to be re-launched after a failover event that causes the management module operating in the second mode to start operating in the first mode. When an event occurs that causes a failover to be performed, as a result of the failover, the second management module may now operate in the first mode (e.g., active mode) and start performing the set of functions performed in the first mode. The first management module, which was previously operating in the first mode (e.g., active mode), may now operate in the second mode (e.g., standby mode) where the set of functions are not performed by the first management module. The second management module, which is now operating in the first mode, may execute a second process that is configured to determine, based upon the configuration information for the application, that the application is to be re-launched after a failover. The second process may then cause the application to be executed by the second management module of the network device.

In certain embodiments, as part of re-launching the application on the second management module, the second process may determine, based upon the configuration information for the application, that the set of conditions has to be satisfied for launching the application. The second process may determine that each condition in the set of conditions is satisfied, and then cause the application to be executed by the second management module.

In certain embodiments, the configuration information for an application may indicate that the application is to be re-launched if the application crashes or becomes non-responsive. The first process executed by the first management module may, upon determining that the application has crashed or become non-responsive, cause the application to be re-launched by the first management module.

In certain embodiments, the configuration information for an application may indicate that a first action is to be performed when a first state is associated with the network device. The first process executed by the first management module may, upon determining that the first state is associated with the network device, cause the first action to be performed. In some instances, the first state associated with the network device may be a state indicating a power down condition for the network device and the first action may comprise writing information for the application to a persistent memory of the network device.

In certain embodiments, the application executed by the first management module may be executed as part of a network operating system (NOS) executed by the first management module.

In certain embodiments, a network device may comprise a first management module configured to operate in a first mode, wherein a set of functions is performed by the first management module when operating in the first mode, and a second management module configured to operate in a second mode when the first management module is operating in the first mode, wherein the set of functions is not performed by the second management module when operating in the second mode. The first management module may execute an application prior to the occurrence of an event that causes a failover. When a failover occurs, the second management module may start operating in the first mode instead of the first management module. The second management module may determine that the application executed by the first management module is to be restarted on the second management module. The second management module may then cause the external application to be restarted on the second management module.

In certain embodiments, a network device or system may comprise a management module comprising one or more processors and a system memory. A network operating system (NOS) may be loaded and executed within the system memory of the management module. A first process (e.g., an ALM daemon) may be executed as part of the NOS. The first process may be configured to receive configuration information for an external application and launch the external application based upon the configuration information. In one embodiment, the external application may be executed within the NOS. The first process may further be configured to monitor the external application and the state of the network device.

In certain embodiments, the first process may be further configured to determine that the external application has terminated unexpectedly or become non-responsive, and, responsive to the determination, and based upon the configuration information for the external application, cause one or more actions to be performed by the management module. The one or more actions may comprise an action that re-launches the external application on the management module.

In certain embodiments, the configuration information for the external application may identify a set of conditions and the first process may be configured to launch the external application upon determining that each condition in the set of conditions is satisfied. In some instances, the set of conditions may include a condition related to a state of the network device.

In some embodiments, the first process may launch the external application during a boot-up sequence, where the boot-up sequence comprises multiple stages. In one such embodiment, the set of conditions may include a condition identifying a particular stage from the multiple stages when, or after which, the external application is to be launched.

In certain embodiments, the management module may execute a second process (e.g., a DCM daemon) within the NOS, where the second process is configured to read the configuration information for the external application from persistent memory, and provide the configuration information to the first process.

In certain embodiments, a network device may comprise a first management module associated with a first system memory and a second management module associated with a second system memory. The first management module may be configured to operate in a first mode (e.g., active mode) and perform a set of functions when operating in the first mode. The second management module may be configured to operate in a second mode (e.g., standby mode) when the first management module is operating in the first mode, wherein the set of functions is not performed by the second management module when operating in the second mode. An event may occur causing a failover to occur. As a result of the failover, the second management module starts operating in the first mode instead of the second mode. When operating in the first mode, the second management module is configured to cause an external application to be launched by the second management module based upon configuration information for the external application, wherein the external application is executed within a network operating system (NOS) executed by the second management module.

The foregoing, together with other features and embodiments will become more apparent upon referring to the following specification, claims, and accompanying drawings.

DETAILED DESCRIPTION

Figure 1:
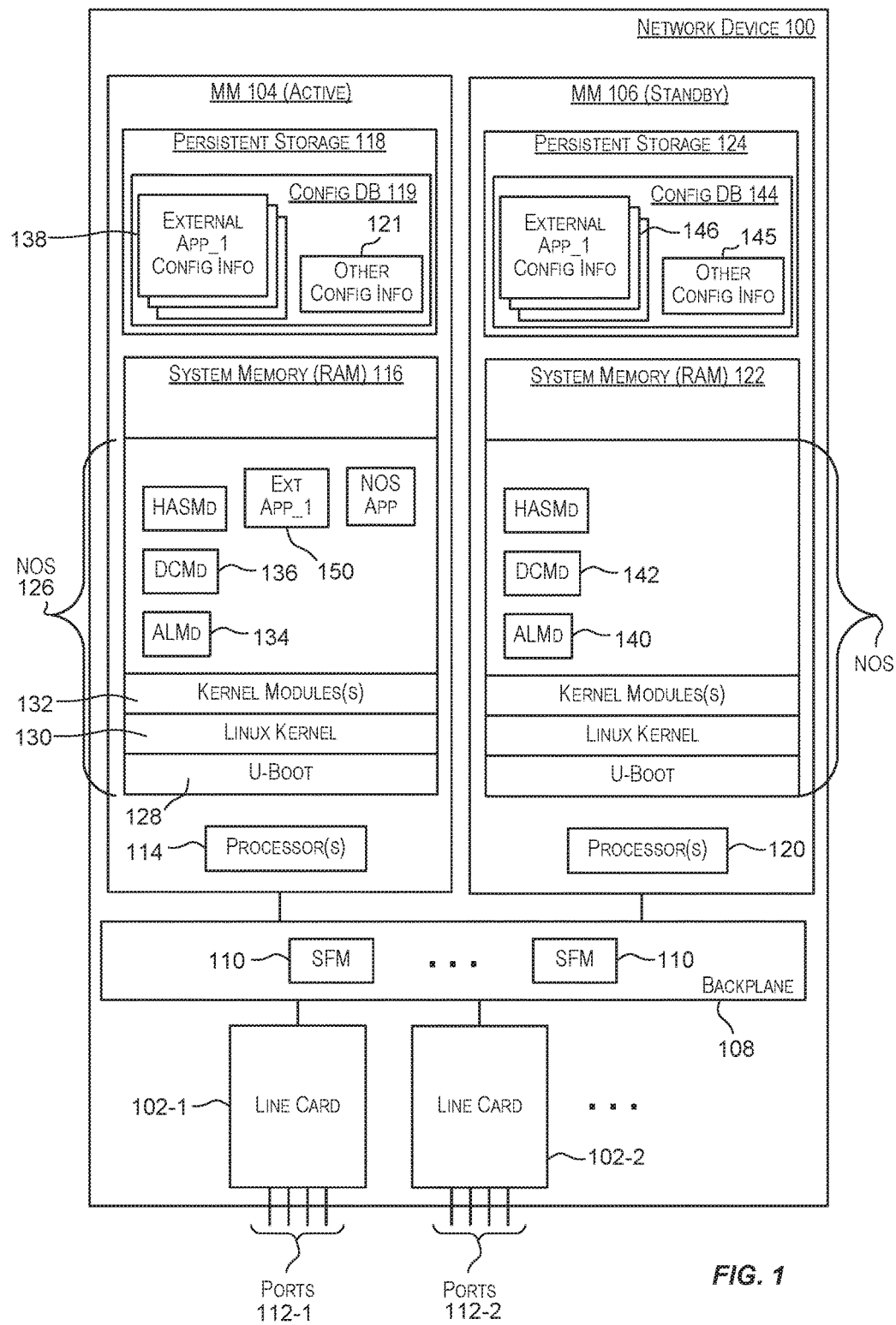
FIG. 1 is a simplified block diagram of a network device incorporating an ALM framework according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to networking technologies, and more particularly to a framework for managing the execution of external applications (e.g., third party applications) on a network device.

An application launcher and management framework (ALM framework) is provided for enabling and managing the execution of external applications (e.g., third party applications) on a network device. The ALM framework enables external applications to be executed and managed on a network device based upon configuration information specified for the external applications. In certain embodiments, the ALM framework enables an external application to be executed within the network device's network operating system (NOS) as if the application was provided as part of the NOS. By enabling the external application to be integrated with the network device's NOS, the ALM framework enables several services provided by the NOS to be made available to the external application.

In certain embodiments, configuration information may be specified for an external application that specifies one or more actions to be taken based upon the state of the external application and/or the state of the network device. The ALM framework is configured to monitor the state of the executing external application and of the network device and take appropriate actions for the external application as specified by the configuration information associated with the external application.

A network device generally comprises software that is provided by the provider of the network device. This software may, for example, be provided as a software image stored on a persistent memory of the network device. This software is generally referred to as the network operating system (NOS) for the network device. When the network device is powered-on or booted, a portion or all of the NOS is loaded into the runtime memory (e.g., RAM) of the network device and executed by the network device. The runtime NOS is responsible for controlling the various functions performed by the network device.

For purposes of this disclosure, an application is considered as an external application with respect to a network device if the application is not provided as part of the network device's network operating system (NOS) by the provider of the network device. For example, a customer using a network device provided by a network device provider may want to execute a customer-provided application on the network device. The customer-provided application is an example of an external application. As another example, an application developed or provided by a third party vendor other than the provider of a network device is an example of an external application. For example, with respect to a network device provided by Brocade Communications Systems, Inc., an application provided by a non-Brocade entity and that is not provided as part of Brocade's NOS for the network device is an example of an external application.

FIG. 1 is a simplified block diagram of a network device or system 100 incorporating an ALM framework according to certain embodiments. Network device 100 may be any device that is capable of receiving and forwarding packets, which may be data packets or signaling or protocol-related packets (e.g., keep-alive packets). Network device 100 may receive one or more data packets and forward the data packets to facilitate delivery of the data packets to their intended destinations. In certain embodiments, network device 100 may be a router or switch such as various routers and switches provided by Brocade Communications Systems, Inc. of San Jose, Calif. Network device 100 depicted in FIG. 1 is merely an example and is not intended to unduly limit the scope of inventive embodiments recited in the claims. One of ordinary skill in the art would recognize many possible variations, alternatives, and modifications. For example, in some implementations, network device 100 may have more or fewer components than those shown in FIG. 1, may combine two or more components, or may have a different configuration or arrangement of components.

In the embodiment depicted in FIG. 1, network device 100 comprises multiple line cards 102-1, 102-2 coupled to two management modules 104, 106 via a backplane 108. Backplane 108 enables communications between cards or modules coupled to backplane 108. For example, backplane 108 may enable communications between a management module and a line card, between the two management modules, and between line cards. In certain embodiments, backplane 108 comprises one or more switch fabric modules (SFMs) 110. For example, if data is to be communicated from one line card 102-1 to another line card 102-2, the data may be received by a SFM 110 of backplane 108 from source line card 102-1. The received data may then be communicated by a SFM 110 of backplane 108 to the destination line card 102-2. Likewise, communications between management modules 104, 106 and between the management modules and the line cards of network device 100 are facilitated using SFMs 110.

Network device 100 depicted in FIG. 1 is commonly referred to as a chassis-based system. Network device 100 may comprise a chassis that provides multiple slots, where a card or blade or module can be inserted into each slot. This modular design allows for flexible configurations, with different combinations of cards in the various slots of the network device for supporting differing network topologies, switching needs, and performance requirements. For example, each of line cards, management modules, and SFMs 110 may be implemented as a card, and the cards can be plugged into slots provided by the chassis of network device 100. For example, in one embodiment, two slots may be provided for the two management module cards, one or more slots may be provided for one or more SFMs, and slots may be provided for the line cards. In certain embodiments, the cards may be hot swappable, meaning they can be inserted and/or removed while network device 100 is powered on.

In certain embodiments, line cards 102-1 and 102-2 represent the data forwarding plane of network device 100. Each line card may comprise or be coupled to a set of ports that may be used for receiving and forwarding packets. For example, in FIG. 1, line card 102-1 comprises ports 112-1 and line card 102-2 comprises ports 112-2. A port may be connected by a link or interface to a neighboring network device or network. In some implementations, multiple ports of network device 100 may be logically grouped into one or more trunks.

The ports of a line card may be capable of receiving and/or transmitting different types of network traffic at different speeds, such as speeds of 1 Gbps, 10 Gbps, 100 Gbps, or more. Various different configurations (e.g., number of ports, types of ports, and capacity of the ports) may be provided in network device 100. For example, one configuration may include 48 10 Gbps ports, 12 40 Gbps ports, 48 1 Gbps ports, 6 100 Gbps ports. Various other combinations and configurations are possible.

At a conceptual level, in certain embodiments, upon receiving a data packet via a port, network device 100 is configured to determine a port to be used for transmitting the data packet from network device 100 to facilitate communication of the packet to its intended destination. Within network device 100, the packet is forwarded from the port on which the packet is received to the determined port for transmitting or forwarding the packet from network device 100. The packet is then transmitted or forwarded from network device 100 using the output port.

A packet may be received by network device 100 via a port on a particular line card. The port receiving the packet may be referred to as the input port and the line card as the source/input line card. A packet processor on the input line card may be configured to extract information from the received packet (e.g., extract the header portion of the received packet) and determine, based upon extracted information and routing information, an output port to be used for forwarding the received packet from network device 100. The output port may be on the same input line card or on a different line card. If the output port is on the same line card, the packet processor on the input line card causes the packet to be forwarded from the input port to the output port. The packet may be then forwarded from network device 100 using the output port. If the output port is on a different line card, then the packet is forwarded from the input line card to the line card containing the output port using backplane 108. The packet is then forwarded from network device 100 using the output port on the output line card. In some instances, the same port may be the input and the output port.

In certain instances, the input line card may be unable to determine how to forward a received packet. The packet may then be forwarded to the active management module, which then determines how the packet is to be forwarded. The active management module may then communicate the forwarding information indicative of how the packet is to be forwarded to the line cards. In some embodiments, the packet processors on the line cards may then be programmed based upon the forwarding information received from the management module. This enables subsequent similar packets received by network device 100 to be forwarded by the line cards without needing to send the packets to the management module for processing. The packet may then be forwarded to the line card coupled to the output port (which may be on input line card or some other line card) and then forwarded from network device 100 to the next hop using via the output port.

Each line card may include components that are configured to cooperatively provide the packet forwarding functionality of network device 100. These components may be one or more single or multicore processors, a system memory associated with the processors, one or more packet processors, and one or more hardware resources. In certain embodiments, a packet processor on a line card may be configured to perform packet classification, modification, forwarding and Quality of Service (QoS) functions. The packet processor may be programmed to perform forwarding of data packets based upon routing information and based upon information extracted from the received packet (e.g., information extracted from a header of the received packet) such that delivery of the packet to its intended destination is facilitated. In certain implementations, packet processing chips, merchant ASICs, or field programmable gate arrays (FPGAs) may be used to implement packet processors on a line card (for example, chips and components provided by Broadcom® or other vendors).

In the example depicted in FIG. 1, network device 100 comprises two redundant management modules 104 and 106 implemented on two separate physical cards. In some alternative embodiments, the two management modules may be implemented on a single physical card. The management modules host the network operating system (NOS) and provide the overall control plane management for network device 100. The control functions may include, for example, performing management functions such as maintaining routing tables, programming the line cards (e.g., downloading information to a line card that enables the line card to perform data forwarding functions), managing sessions for various networking protocols executed by network device 100 (e.g., sessions for sending signaling keep-alive packets), and the like.

In the embodiment depicted in FIG. 1, two management modules are provided for purposes of redundancy. Redundant management modules 104 and 106 are provided to increase the availability of network device 100. The redundancy enables one management module to take over the function performed by the other management module if there is any problem with the other management module. In certain embodiments, the management modules are configured to operate according to the active-standby model. According to this model, during normal operations, one of the management modules is configured to operate in active mode while the other operates in standby mode. The management module operating in the active mode is referred to as the active management module. The management module operating in standby mode is referred to as the standby management module. In FIG. 1, management module 104 is shown as operating in active mode (i.e., is the active management module) and management module 106 is shown as operating in the standby mode (i.e., is the standby management module).

In certain embodiments, the active management module is configured to perform a set of functions (e.g., management and control functions) for network device 100 that are not performed by the standby management module. The active management module may also take ownership of and management of hardware resources of network device 100. The process of the standby management module becoming the active management module and the previously active management module becoming the standby management module is referred to as a failover (sometimes referred to as a switchover). When a failover occurs, the standby management module may become the active management module and take over performance of the set of functions performed by a management module in active mode. The management module that was previously operating in active mode (i.e., the previous active management module) may then become the standby management module. The role of the standby management module is thus to remain ready to take over the functions performed by the active management module in the event of a failover. A failover enables the set of functions performed in active mode by a management module to be continued to be performed without substantial interruption. Redundant management modules may thus reduce or even eliminate the downtime of network device 100, which translates to higher availability of network device 100. The active-standby model in the management plane enhances the availability of network device 100, allowing the network device to support various high-availability functionalities such as graceful restart, non-stop routing (NSR), and the like.

Various different events may cause a failover to occur. Failovers may be voluntary or involuntary. A voluntary failover may be purposely caused by an administrator or user of the network device or network. For example, a network administrator may, for example, using a command line instruction, purposely cause a failover to occur. There are various situations when this may be performed. As one example, a voluntary failover may be performed when software for the active management module is to be upgraded. As another example, a network administrator may cause a failover to occur upon noticing performance degradation on the active management module or upon noticing that software executed by the active management module is malfunctioning.

An involuntary failover typically occurs due to some critical failure in the active management module. This may occur, for example, when some condition causes the active management module to be rebooted or reset. This may happen, for example, due to a problem in the management module, critical failure of software executed by the active management module, and the like. An involuntary failover causes the standby management module to automatically become the active management module.

In the embodiment depicted in FIG. 1, each management module comprises one or more processors, a system memory, and persistent storage. A management module may comprise one or more processors, which could be single or multicore processors and associated system memory. The processors may be general purpose microprocessors such as ones provided by Intel®, AMD®, ARM®, Freescale Semiconductor, Inc., and the like, which operate under the control of software stored in associated memory. The system memory associated with a processor on a management module may provide memory resources for programs executed by the processors. The system memory is typically a form of random access memory (RAM) (e.g., dynamic random access memory (DRAM), Synchronous DRAM (SDRAM), Double Data Rate SDRAM (DDR SDRAM)). As shown in FIG. 1, management module 104 comprises processors 114, a system memory 116, and persistent storage 118, while management module 106 comprises processors 120, a system memory 122, and persistent storage 124.

Each management module may also comprise other hardware resources or devices (not shown in FIG. 1), which may include without restriction one or more field programmable gate arrays (FPGAs), application specific integrated circuits (ASICs), I/O devices, and the like. I/O devices may include devices such as Ethernet devices, PCI Express (PCIe) devices, and others. The hardware resources on a management module may facilitate the functions performed by the management module.

During normal operation of network device 100, the active management module and the standby management module may communicate with each other. For example, messages may be passed between the management modules to synchronize network state information between the management modules. The network state information may comprise information that enables the standby management module to become the active management module upon a failover in a non-disruptive manner. As described below, information related to external applications may also be synchronized between the active management module and the standby management module.

The management modules may use different schemes to communicate with each other including but not restricted to Ethernet-based messaging, Peripheral Component Interconnect (PCI)-based messaging, shared memory based messaging, and the like. In certain embodiments, each management module comprises an Ethernet port that is dedicated to inter-management module communications (another separate Ethernet port(s) may be provided for communications between the management module and the line cards.)

In certain embodiments, when network device 100 is powered up or when a management module is booted (or rebooted), the network operating software (NOS) provided for the network device may be loaded into the system memory of a management module and executed by the management module. The NOS may be loaded, for example, from a persistent storage (e.g., a disk storing a software image of the NOS) associated with network device 100. Each management module thus hosts and executes the network operating system (NOS) during runtime. The NOS hosted by the management module enables the management module to perform the control plane management functionality for network device 100. In the example depicted in FIG. 1, NOS 126 is loaded into system memory 116 of active management module 104. NOS 126 may also be referred to as runtime NOS since it is executed by management module 104 during runtime of network device 100. The standby management module 106 also has a NOS loaded in its system memory 122. The version of NOS loaded in the system memory of standby management module 106 is generally the same as the version of NOS loaded by the active management module, but may be different in some embodiments. The NOS may be loaded into the system memory of the active and standby management modules during startup or power-up of network device 100, or when a management module is rebooted.

A NOS loaded into the system memory of a management module may include multiple software components. For example, in the example in FIG. 1, NOS 126 loaded in system memory 116 of active management module 104 comprises a u-boot component 128, a Linux kernel 130, one or more kernel modules 132, and one or more processes. In certain embodiments, the kernel modules (e.g., kernel modules 132) are dynamically loadable and are used for controlling the hardware resources (e.g., ASICs) on the management module and for communications between the management modules. Some components of the NOS may be run in kernel space while others may be run in application or user space of the system memory.

The NOS loaded by a management module may include various processes that are executed by one or more processors of the management module. These processes may include one or more daemons (e.g., an ALM daemon, a Distributed Configuration Management daemon or DCM daemon, a daemon for providing High Availability related services (HASMd), and others), and other NOS applications. The processes and daemons may be loaded and started in a particular sequence as part of the startup or boot-up procedure. In certain embodiments, the ALM framework is implemented by an ALM daemon working in cooperation with a configuration daemon (referred to as Distributed Configuration Management daemon or DCM daemon) and other processes and daemons executed as part of the runtime NOS of a management module. As part of the boot-up sequence for the management modules, the ALM and DCM daemons are started on both the active management module and the standby management module. The daemons may run as background processes on the management modules. For example, in the embodiment depicted in FIG. 1, ALM daemon 134 and DCM daemon 136 may be started and run as background processes on active management module 104, and ALM daemon 140 and DCM daemon 142 may be started and run as background processes on standby management module 106. The daemons on the active and standby management modules may be started early on in the management module boot-up or power-up sequence.

In certain embodiments, DCM daemon 136 on active management module 104 is responsible for receiving and managing configuration information for network device 100. The configuration information may be stored in persistent storage 118, for example, in a configuration database 119. Each management module may maintain its own copy of the configuration database. For example, as shown in FIG. 1, standby management module 106 may have its own configuration database 144 stored in its persistent memory 124.

In certain embodiments, DCM daemon 136 on active management module 104 is responsible for receiving and managing configuration information 138 for external applications that are to be managed by the ALM framework of network device 100. This configuration information received for the external applications is then used by ALM daemon 134 on the active management module for launching and managing the external applications. Configuration database 119 may store configuration information for one or multiple external applications, with each external application having its own specific configuration information.

In certain embodiments, the configuration database on a management module may also store configuration information for other components. For example, as depicted in FIG. 1, configuration database 119 on active management module 104 may store other configuration information 121, and configuration database 144 on standby management module 106 may store other configuration information 145. For example, the configuration database may store configuration information for one or more daemon processes of the NOS, such as for the ALM daemon. The configuration information for the ALM daemon may specify, for example, how and when the ALM daemon is to be started or restarted and other configuration information.

A user of network device 100 may use the ALM framework to identify and initiate execution of an external application by network device 100 and also to provide configuration management for the external application to network device 100. Network device 100 may provide various different techniques that enable a user to interact with the ALM framework and provide information related to an external application. These techniques may include, for example, using command line interfaces (CLIs), using HTTP requests/ interfaces, and others.

In certain embodiments, DCM daemon 136 is responsible for receiving configuration information for an external application and storing the information in configuration database 119. For example, in one embodiment, a user may provide external application related information to DCM daemon 136 using one or more CLIs provided by network device 100. In certain embodiments, DCM daemon 136 may support multiple plugins, with one or more plugins provided for the ALM framework.

Various different types of configuration information may be provided for an external application. The following list (not limiting) identifies examples of configuration information that may be provided for an external application:

(1) Information identifying the external application. In some instances, a unique application identifier may be provided for the external application.

(2) Information identifying where the external application is installed. For example, this information may identify a storage location where the external application is stored and from where it is to be loaded and executed.

(3) Information identifying whether the external application is to be managed by the ALM framework. The ALM framework enables a user to select whether or not the ALM framework is to manage the external application. For a particular external application, the user may decide to opt out the external application from being managed by the ALM framework, in which case, the external application will not be managed by the ALM framework. ALM framework manages only those external applications for which management of the external applications by the ALM framework is elected. In certain embodiments, the default option is for the ALM framework to manage an external application. If the ALM framework is to manage an external application, then additional configuration information may be provided for the external application indicating how the external application is to be managed under specific circumstances (for example, when the external application is to be launched, processing to be performed when the external application becomes non-responsive, how the external application is to be handled when a failover occurs, etc.).

(4) Information identifying whether or not the external application is to be launched at boot-up time (or start-up time). If the launch option is selected for the external application, then information may further be specified identifying one or more conditions that need to be satisfied before the external application can be launched or executed. The one or more conditions may be related to one or more states of the network device that have to be met before the external application can be launched, information identifying a particular stage of the boot-up sequence during which, or after which, the external application can be launched, and the like. For example, configuration information may be provided that the external application is to be launched only after the ports of the network device are ready for receiving and forwarding packets. In certain embodiments, the default option is for the ALM framework to launch the external application.

(5) Information indicating processing to be performed when the external application is detected by ALM framework (e.g., by the ALM daemon) to have terminated unexpectedly or become non-responsive. This information, for example, may indicate whether the external application is to be restarted/re-launched or not. In certain embodiments, the default option is for the ALM framework to re-launch the external application.

(6) Information indicating how the external application is to be handled when a failover occurs. For example, in one embodiment, the user may indicate whether the external application is to be provided high availability (HA) support or not. Selection of HA support for the external application may indicate that the external application is to be started on the new active management module after a failover. In certain embodiments, the default option is for the ALM framework to launch the external application on the new active management module after a failover.

The configuration information for an external application thus provides predictability with regards to how an external application is to be handled by the ALM framework of a network device.

In certain embodiments, the DCM daemon 136 on active management module 104 may store the configuration information received by DCM daemon 136 for an external application in a database (e.g., a configuration database 119) in persistent storage 118 on the active management module. Configuration information for one or more external applications may be stored in the database.

In certain embodiments, DCM daemon 136 is configured to periodically provide the configuration information stored in persistent storage 118 for one or more external applications to ALM daemon 134 executing on active management module 104. ALM daemon 134 may then use this information received from DCM daemon 136 to launch and manage one or more external applications on the active management module per the configuration information stored for the external applications.

As previously indicated, ALM and DCM daemons are started on both the active management module and the standby management module. For example, in the embodiment depicted in FIG. 1, ALM daemon 134 and DCM daemon 136 may be started and run as background processes on active management module 104, and ALM daemon 140 and DCM daemon 142 may be started and run as background processes on standby management module 106. In certain embodiments, during normal operations of network device 100, the DCM daemons on the active and standby management module communicate with each other to synchronize the configuration information for the external applications stored in their respective configuration databases. As described above, DCM daemon 136 on active management module 104 may receive configuration information for one or more external applications and store the information 138 in configuration database 119 in persistent memory 118 on active management module 104. Periodically, DCM daemon 136 may communicate with DCM daemon 142 on standby management module 106 to sync up the configuration information stored in configuration database 119 with the information stored in configuration database 144 on the standby management module. In this manner, the DCM daemons communicate with each other to synchronize the external applications related configuration information stored in the configuration databases on the active and standby management modules.

In certain embodiments, the ALM daemons on the active and standby management modules also communicate with one another to sync up their in-memory information. For example, in the embodiment depicted in FIG. 1, ALM daemon 134 may communicate and sync up information related to the external applications with ALM daemon 140 on standby management module 106. In this manner, information related to external applications available to ALM daemon 134 is synced up and made available to ALM daemon 140 on standby management module 106.

In certain embodiments, ALM daemon 134 on the active management module is responsible for launching external applications. ALM daemon 134 on the active management module is also configured to monitor the external applications that are executing on the active management module. For example, ALM daemon 134 may monitor and keep track of the one or more external applications executed by active management module 104. This monitoring enables ALM daemon 134 to detect when an external application crashes/terminates unexpectedly or becomes non-responsive. ALM daemon 134 may then, in response, cause one or more corrective actions to be performed for the crashed or non-responsive application based upon configuration information for that external application. These corrective actions may include, for example, re-launching the external application. In some embodiments, the corrective actions to be taken (e.g., whether or not the external application is to be re-launched) may be specified in the configuration information specified for the external application. As previously described, the configuration information for an external application may be provided to DCM daemon 136 and stored in configuration database 119. DCM daemon 136 may provide this information to ALM daemon 134.

Additionally, in certain embodiments, ALM daemon 134 is also configured to monitor the state of network device 100. In certain implementations, ALM daemon 134 may monitor certain pre-configured states of the network device. A network device generally comprises various components that are configured to track occurrences of events within the network device, where the events are indicative of states associated with or occurring in the network device. Upon detecting an event, these components may be configured to forward the events information to a centralized events handler (e.g., an events logger component) that may store a centralized repository of the current states associated with the network device. The centralized handler may then be configured to forward the states information to components of network device 100 that are interested in receiving the states information. In one embodiment, ALM daemon 136 on the active management module may register with the centralized events handler so that the ALM daemon receives information indicative of certain pre-configured states of the network device from the centralized handler. Examples of states associated with the network device that may be monitored by the ALM daemon include without limitation: system boot-up or power-up related states, CLI related states such as ready or not ready (represents that the network device is ready to accept user commands), system shutdown, high availability and failover related states, states related to the ports of the network device indicative of whether the ports are enabled/disabled, state when a daemon crashes or terminates unexpectedly, and the like. In certain embodiments, ALM daemon 134 on the active management module may receive the events information indicative of the states of network device 100 and may periodically communicate with ALM daemon 140 on standby management module 106 to sync up the state information.

Figure 2:
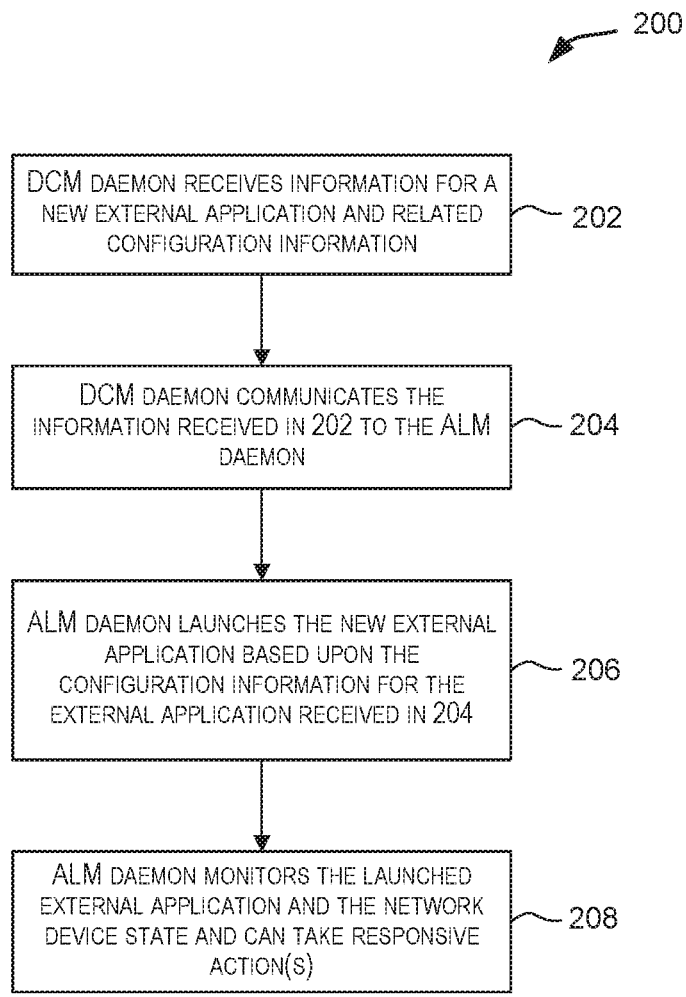
FIG. 2 depicts a simplified flowchart depicting processing performed by the ALM framework according to certain embodiments.

FIG. 2 depicts a simplified flowchart 200 depicting processing performed by the ALM framework according to certain embodiments. The processing depicted in FIG. 2 may be implemented in software (e.g., code, instructions, program) executed by one or more processing units (e.g., processors, cores), hardware, or combinations thereof. The software may be stored on a non-transitory storage medium (e.g., on a memory device). The method presented in FIG. 2 and described below is intended to be illustrative and non-limiting. The particular series of processing steps depicted in FIG. 2 is not intended to be limiting. In certain embodiments, the method depicted in FIG. 2 is performed by the ALM framework on the active management module.

For purposes of flowchart 200, it is assumed that the network device has been powered on and is operating in a stable condition with one management module operating as the active management module and the other management module operating as the standby management module. It is also assumed that an ALM daemon (e.g., ALM daemon 134 in FIG. 1) and a DCM daemon (e.g., DCM daemon 136 in FIG. 1) are executing as background processes on the active management module.

In 202, the DCM daemon on the active management module may receive information identifying a new external application and configuration information for the external application. For example, the information may be received as part of a request from a user (e.g., a customer, a $3^{rd}$ party vendor of the external application) to execute an external application on the network device. There are various ways in which the external application-related information may be provided to the DCM daemon. For example, in one embodiment, the information may be received via a CLI of the network device. In other embodiments, the information may be received by the DCM daemon via an HTTP request/interface. In alternative embodiments, yet other channels may be used for providing the information in 202 to the DCM daemon.

The configuration information for an external application may include various types of information related to the external application. Examples of information that may be included in the configuration information for an external application have been described above.

At 204, the DCM daemon communicates the information received in 202 to the ALM daemon. As part of 204, the DCM daemon may also store the received information in a configuration database, such as configuration database 119 depicted in FIG. 1.

At 206, the ALM daemon may launch the new external application on the active management module based upon the configuration information for the external application. For example, if the configuration information identifies one or more conditions that need to be satisfied before the external application can be launched, then as part of 206, the ALM daemon may first determine if those conditions are satisfied and launch the external application only upon determining that the conditions are satisfied.

In certain embodiments, the launch of the external application may be conditioned upon or tied to a specified time (e.g., date and time combination). The ALM daemon may then launch the external application when that time condition is satisfied.

At 208, the ALM daemon may start monitoring the launched external application. ALM daemon may also start monitoring the state of the network device. As a result of this monitoring, the ALM daemon can detect changes in the external application state and/or the state of the network device and take responsive actions when appropriate. For example, the configuration information received for the external application may identify one or more actions to be taken when the external application is deemed to be non-responsive or to have crashed or terminated unexpectedly. Accordingly, while monitoring the external application, if the ALM daemon determines that the external application has terminated unexpectedly or become non-responsive, then those one or more actions may be initiated by the ALM daemon in response. These actions may include, for example, re-launching the external application. In this manner, the ALM daemon can monitor and detect different states of the external application and take responsive actions as appropriate based upon the configuration information for the external application.

As described above, as part of 208, the ALM daemon is also configured to monitor the state of the network device. In certain embodiments, the configuration information for an external application may specify different actions to be performed in response to different states of the network device. Accordingly, as part of 208, ALM daemon may monitor certain pre-configured states of the network device and take appropriate actions for the external application when a specific state is detected. For example, the configuration information for an external application may specify that the external application is to be restarted upon a failover event. In this case, after a failover, the ALM daemon on the active management module may detect that a failover has occurred and take one or more responsive actions for the external application. These one or more responsive actions may include, for example, re-launching the external application on the new active management module.

As another example, the configuration information for the external application may specify one or more actions to be taken for an external application when the network device or the active management module is going through a power down or shutdown stage. These actions may include, for example, flushing the external application data, writing information (e.g., configuration information) to persistent storage, and other actions to ensure a proper shut down of the external application. When ALM daemon detects a shutdown or power down state for the network device or the active management module, then the actions specified for the external application may be performed by the active management module as part of the shutdown processing.

In certain embodiments, the ALM daemon may also be configured to log information related to the external applications and the state of the network device. For example, the ALM daemon on the active management module may log information to one or more logs. Information written to a log for an external application may include information such as information related to when and how many times the external application was launched or re-launched, the network device state information when the external application was launched/re-launched, instances when the external application terminated unexpectedly or became non-responsive, responsive actions, if any, taken when the external application terminated unexpectedly or became non-responsive, and the like.

The ALM framework also enables a provider of an external application to change the configuration information associated with the external application over time. For example, the external application provider may use CLIs provided by the network device to update or make changes to the configuration information associated with an external application. In some instances, an administrator of the network device may also be allowed to make changes to the configuration information associated with an external application.

Figure 3:
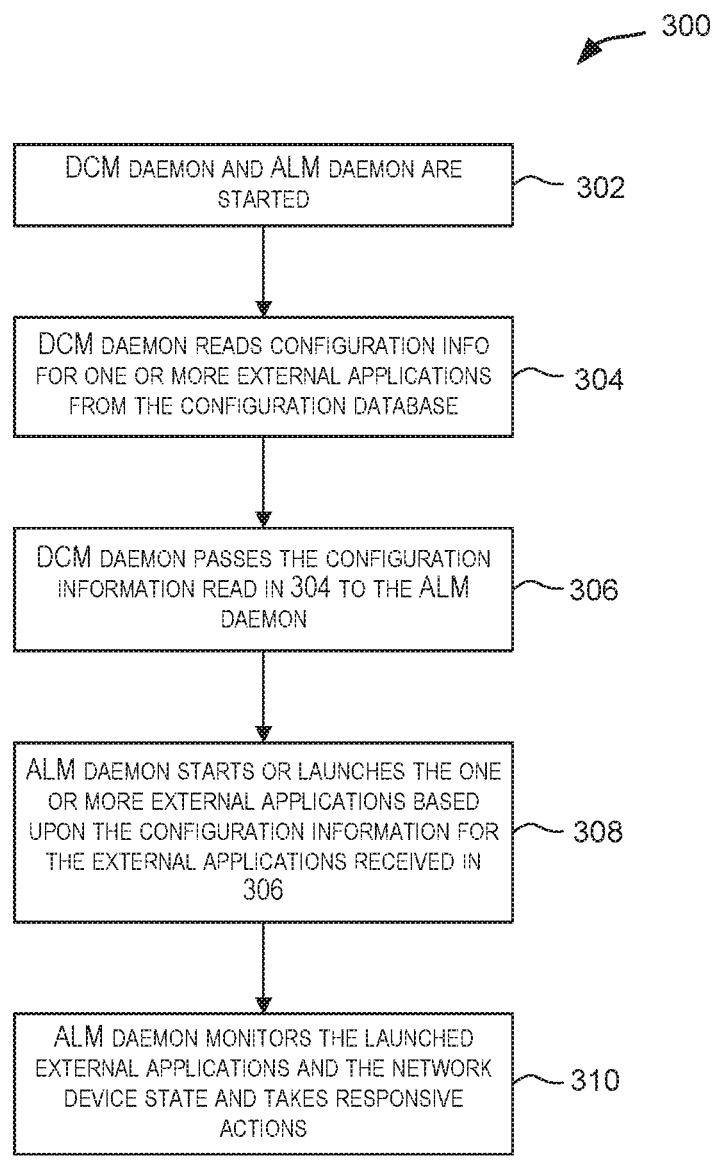
FIG. 3 depicts a simplified flowchart depicting processing performed by the active management module after the network device is powered on according to certain embodiments.

FIG. 3 depicts a simplified flowchart 300 depicting processing performed by the active management module after the network device is powered on according to certain embodiments. The processing depicted in FIG. 3 may be implemented in software (e.g., code, instructions, program) executed by one or more processing units (e.g., processors, cores), hardware, or combinations thereof. The software may be stored on a non-transitory storage medium (e.g., on a memory device). The method presented in FIG. 3 and described below is intended to be illustrative and non-limiting. The particular sequence of processing steps depicted in FIG. 3 is not intended to be limiting.

In certain embodiments, one or more of the processing steps depicted in FIG. 3 may be performed as part of the boot-up sequence on the active management module that may occur when the network device is powered-up or when the management module is booted or rebooted. As part of the boot-up sequence, at 302, the DCM and ALM daemons are started on the active management module. These daemons may be started as part of loading the NOS on the active management module.

At 304, the DCM daemon reads configuration information for one or more external applications from its configuration database. As previously indicated, the configuration database may be stored in persistent memory on the active management module. At this point, the configuration database may store configuration information for external applications that has previously been received by the ALM framework. At 306, the DCM daemon passes or communicates the configuration information read in 304 for the one or more external applications to the ALM daemon.

At 308, the ALM daemon launches the one or more external applications based upon the configuration information related to the external applications received from the DCM daemon in 306. In certain embodiments, the external applications are executed as part of the NOS space. For example, as depicted in FIG. 1, external application "EXTAPP_1" 150 is executed as part of NOS 126 on the active management module. In certain embodiments, a portion of the system memory allocated for the runtime NOS on the active management module is set aside or reserved for executing external applications and an external application is executed within this reserved portion of system memory.

As previously described, the configuration information for an external application may identify one or more conditions to be satisfied before the external application can be launched or executed. These conditions may be related to one or more states of the network device that have to be met before the external application can be launched, may identify a particular stage of the boot-up sequence during which, or after which, the external application can be launched, and the like. As part of the processing performed in 308 for launching a particular external application, ALM daemon may first determine the conditions specified in the configuration information for that particular external application that need to be satisfied before the external application can be launched. The ALM daemon may then determine if those conditions are satisfied and launch the particular external application only after determining that the conditions are satisfied. For example, for a particular external application, the configuration information for that external application may specify that the external application is to be launched only after the network device has reached a CLI ready state, the ports of the network device are enabled, and the state of the network device is "Stable." For such an external application, the ALM daemon may launch the external application only after all of these conditions are satisfied. Various different conditions may be specified for different external applications.

After an external application has been launched in 308, at 310, the ALM daemon may start monitoring the launched external application. Additionally, ALM daemon may also start monitoring the state of the network device. As a result of this monitoring, the ALM daemon can detect changes in the external application state and/or the state of the network device and take responsive actions when appropriate as configured in the configuration information for the external application.

In the manner depicted in FIG. 3 and described above, the ALM framework comprising the ALM daemon working in conjunction with the DCM daemon is capable of automatically launching an external application, monitor the launched external application along with the state of the network device, and take one or more actions responsive to changes in the state of the external application or the network device, based upon configuration information specified for the external application. A user of network device 100 has complete flexibility in specifying the configuration information for an external application. For example, the ALM framework may provide various opt-in/opt-out options for an application. For example, a particular external application may opt in or out of being managed by the ALM framework. Likewise, a particular external application may opt in or out of being launched during a boot-up or start-up. The processing depicted in FIG. 3 and described above may be performed only for those external applications that have opted to be managed by the ALM framework and have also selected the launch at boot-up option. The user also has complete flexibility in specifying, via configuration information provided for an external application, the one or more actions to be taken by the ALM framework depending upon the state of the external application and/or the state of the network device.

Figure 4:
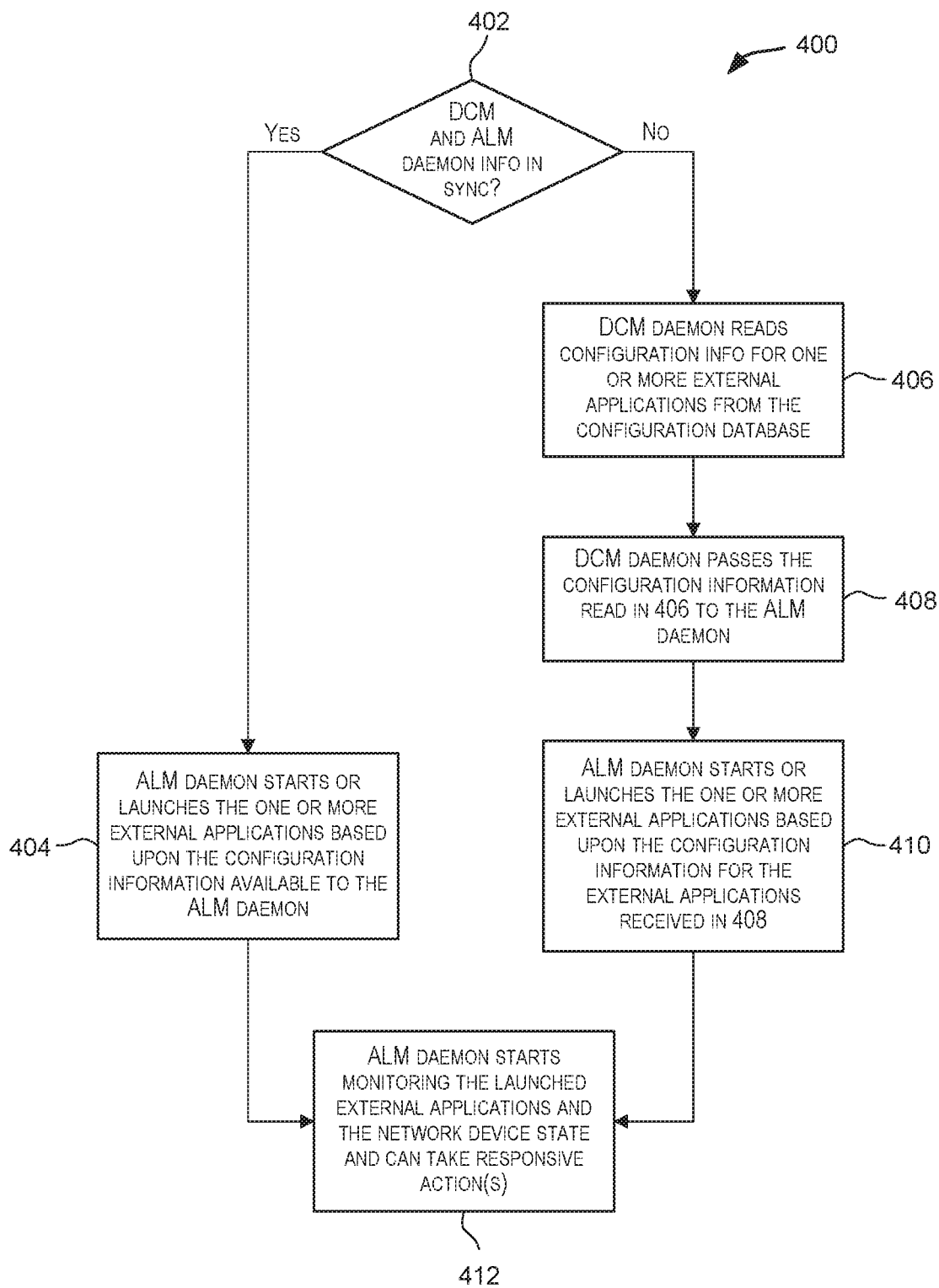
FIG. 4 depicts a simplified flowchart depicting processing performed by the new active management module after a failover according to certain embodiments.

FIG. 4 depicts a simplified flowchart 400 depicting processing performed by the new active management module after a failover according to certain embodiments. The processing depicted in FIG. 4 may be implemented in software (e.g., code, instructions, program) executed by one or more processing units (e.g., processors, cores), hardware, or combinations thereof. The software may be stored on a non-transitory storage medium (e.g., on a memory device). The method presented in FIG. 4 and described below is intended to be illustrative and non-limiting. The particular series of processing steps depicted in FIG. 4 is not intended to be limiting.

As previously described, as a result of a failover, the previous standby management module becomes the new active management module and the previous active management module may operate in standby mode. The processing depicted in FIG. 4 may be performed by the new active management module that operates in the active mode as a result of a failover.

At 402, a check is made to see if the DCM and ALM daemons on the new active management module are considered to be in sync with DCM and ALM daemon on the previous active management module. With respect to the DCM daemons, a check is made in 402 to see if the DCM daemon on the new active management module is in sync with the DCM daemon of the previous active management module. As previously described, the DCM daemons on the active and standby management modules communicate with each other to sync up configuration information available to the DCM daemons and to sync up their respective configuration databases information. For example, in FIG. 1, DCM daemon 136 communicates with DCM daemon 142 to sync up the configuration information available to the DCM daemons, and also to sync up configuration information for external applications stored in configuration databases 119 and 144. In certain embodiments, flags are used in network device 100 to indicate when the DCM daemon on the active management module is in sync. Accordingly, in 402, these flags are checked to determine whether the DCM daemon on the new active management module is indicated as being in sync with the DCM daemon of the previous active management module.

With respect to the ALM daemon, a check is made in 402 to see if the ALM daemon on the new active management module has been synced with the ALM daemon on the previous active management module. As previously indicated, the ALM daemons on the active and standby management modules communicate with each other to sync up their respective external applications configuration information, which is stored in system memory. For example, in FIG. 1, ALM daemon 134 communicates with ALM daemon 140 to sync up the external applications related configuration information. Accordingly, in 402, a check is made if the ALM daemon information on the new active management module is indicated as being in sync with the ALM daemon information of the previous active management module. In certain embodiments, flags are used in network device 100 to indicate when the ALM daemons are in sync. Accordingly, in 402, these flags are checked to determine whether the ALM daemon on the new active management module is indicated as being in sync with the ALM daemon on the previous active management module.

If it is determined in 402 that both the DCM configuration information and the ALM daemon information is in sync, then at 404, the ALM daemon on the new active management module launches one or more external applications based upon the configuration information related to the external applications available to the ALM daemon. Only those external applications that have selected to be managed by the ALM framework and that have selected failover handling are launched in 404. The external applications are executed by the new active management module. The external applications may be executed as part of the runtime NOS on the new active management module. In certain embodiments, a portion of the system memory allocated for the NOS on the new active management module is set aside or reserved for executing external applications and external applications are executed within this reserved portion of system memory.

It is to be noted in 404 and 412, that since the external applications configuration information is already available to the ALM daemon (due to the ALM daemon information being in sync), there is no need for the DCM daemon on the new active management module to read the information from the configuration database or for the DCM daemon to pass the information to the ALM daemon. The ALM daemon can directly proceed with launching the external applications. This makes the task of launching external applications significantly faster and also makes the overall failover processing faster.

After an external application has been launched in 404, at 412, the ALM daemon starts monitoring the external application and also the state of the network device. As a result of this monitoring, the ALM daemon can detect changes in the external application state and/or the state of the network device and take responsive actions when appropriate.

If it is determined in 402 that either the DCM configuration information is not in sync or that the ALM daemon information is not in sync, then at 406, the DCM daemon on the new active management module reads configuration information for one or more external applications from its configuration database stored in persistent memory on the new active management module. At 408, the DCM daemon passes or communicates the configuration information read in 406 for the one or more external applications to the ALM daemon on the new active management module. At 410, the ALM daemon on the new active management module launches the one or more external applications based upon the configuration information related to the external applications received from the DCM daemon in 408. The external applications may be executed as part of the runtime NOS on the active management module. Only those external applications that have selected to be managed by the ALM framework and that have selected failover handling may be launched in 410. Processing then continues with 412 wherein the ALM daemon starts monitoring the external application and also the state of the network device and can take responsive actions, when appropriate, based upon changes to the states of the external applications and/or the state of the network device.

In the manner depicted in FIG. 4 and described above, an external application can use and benefit from the high availability failover capabilities provided by the network device. The failover capability does not have to be built into or programmed into the external application. The external application benefits from failover handling provided by the ALM framework. The provider of the external application only has to indicate, as part of the configuration information for the external application, that the ALM framework is to handle failover handling for the external application (e.g., opt-in for failover handling) and the ALM framework takes care of the rest.

As described above, in certain embodiments, a user may use CLIs supported by a network device to interact with the ALM framework. For example, a user may use CLIs to provide external application and associated configuration information to the ALM framework. The following lists examples of CLIs that may be provided in certain embodiments. These CLIs are meant only as examples and are not intended to be limiting in any manner.

(a) STATE

The STATE CLI can be used to schedule jobs (e.g., commands or shell scripts) to run at predefined system states. Each STATE may represent a job and is composed of a system STATE, followed by a shell command to execute.
Syntax:
  STATE appName State A B C command_to_execute
Where:
  appName—Name of the external application
  State—System state when the external application is to be activated
  A—Value of 1 or 0, end user defined entry
  B—Value of 1 or 0; "1" to indicate that the external application is to be restarted, or "0" to indicate that the external application is not to be restarted
  C—Value of 1 or 0; "1" to indicate that external application termination is to be logged, or "0" to indicate that the external application termination is not to be logged Examples STATE DHCPActive CLIReady 0 1 0 dhcpd-p dhcp.conf
  STATE DHCPServer DHCPEnable 0 1 1 dhcpd-p dhcp.conf (b) TIMER This function is a time-based job scheduler. A user can use "TIMER" to schedule jobs (commands or shell scripts) to run periodically at fixed times, dates, or intervals. Each TIMER represents a job, and is composed of a Linux cron type expression, followed by a shell command to execute. In certain embodiments, the ALM framework may use Linux CRONJOB to support this feature.
Syntax:
  TIMER appName State A Min Hour Day Month Week
where:
  appName—Name of the external application
  State—System state when the external application is to be activated
  A—Value of 1 or 0, end user defined entry
  Min—Minutes, range: 0-59
  Hour—Hour, range: 0-23
  Day—Day of month, range (1-31)
  Month—Month, range (1-12)
  Week—Day of week, range (0-6; Mon-Sun)

Example (1) The following clears the DHCP error log at one minute past midnight (00:01) every day.
  TIMER DHCP_ERR_LOG CLIReady 1 0 1 0 * * * printf>/dhcp/log/error_log
(2) This example runs a shell program called dhcp_dump.sh at 20:00 (8:00 PM) every day. dhcp_dump.sh will be invoked from application working directory/app/dhcp
  TIMER DHCP_DUMP CLIReady 1 0 0 20 * * * /dhcp_dump.sh (c) al start appName [norestart] command "command_to_execute"

This CLI may be used to start an application using the ALM framework with application auto-restart option. The default is to auto-restart, which will make the application be restarted automatically when the network device reaches CLI Ready state. The application will be restarted if it becomes non-responsive or terminates unexpectedly. The user can use the "norestart" option to disable the auto-restart function. A log may also be generated when the application is started or terminated.

(d) al timer appName command "timer job"

This CLIS may be used to initiate a timer job scheduler request. In a slot based system, the request may be set and persistent on both management modules, but only the active management module will activate the request. In certain embodiments, the request is activated when a standby management module becomes the active management module and is ready to serve the CLI. The default may be to not restart the application automatically after system boot up or upon unexpected termination.

(e) al stop appName

This CLI may be used to stop an application. The application, if already activated, is terminated.

(f) al show

This CLI may be used to display all user defined job scheduler settings.

As described above, the ALM framework is able to automatically launch and manage an external application based upon configuration information specified for the external application. In certain embodiments, the launched application is executed as part of the runtime NOS of the management module and is thus tightly integrated with the NOS. It is to be noted that a separate virtual machine does not have to be instantiated to run the external application. In certain embodiments, the ALM framework enables an external application to be executed within the network device's network (NOS) as if the application was provided as part of the NOS. By enabling the external application to be integrated with the network device's NOS, the ALM framework enables several services provided by the NOS (e.g., support for failover handling) to be made available to the external application. For example, in a network device and NOS provided by Brocade Communications Systems, Inc., the external application can benefit from the support services provided to an internal Brocade NOS application.

In certain embodiments, the ALM framework can be provided, for example, on an embedded platform provided by Brocade Communications Systems, Inc., such that third party applications from customers can be integrated with native Brocade software on Brocade's network devices and achieve proper boot-up sequence handling, software upgrade procedure, high availability (HA) failover handling capabilities, and the like. From the perspective of a customer of a network device, the ALM framework enables the customer to launch an external application on a network device without being dependent upon the provider of the network device. The external application may help enhance the features or functions provided by the network device, for example, at the customer site. Further, the ALM framework enables the external application to benefit from various features supported by a NOS such as processing performed responsive to unexpected termination or crash handling, failover handling, etc., and without these features having to be programmed into the external application. The ALM framework provides an infrastructure that enables an external application to be integrated with the NOS of the network device.

The ALM framework enables third party applications developed by other vendors to be able to run on a network device and for those applications to be aware of and reap the benefits of support and services provided by the of the network device. For example, the ALM framework enables an external application to be automatically launched during a boot-up sequence while taking into consideration the configuration applicable for the application. In certain embodiments, the external application is treated as an internal NOS application that is native to the network device. The ALM framework thus provides a plug-and-play open framework to seamlessly integrate third party applications into the NOS of a network device.

The ALM framework thus greatly extends the capability of a network device platform in the field of deployment. It also creates a way for OEM and end users to develop vendor specific software that can be run on a network device having an ALM framework and enabling the ALM framework to handle and resolve the NOS high availability and DCM dependence.

As described above, the configuration information for an external application is persisted in a configuration database stored in persistent memory. The configuration information for an external application deterministically indicates how the external application is to be managed. For example, the configuration information for an external application indicates conditions that have to be satisfied for the external application to be launched, processing to be performed when the external application terminates unexpectedly or becomes non-responsive, processing to be performed upon a failover, and the like. The configuration information thus deterministically declares how the external application is to be handled when the state of the external application changes, or when the state of the network device changes. Further, since the configuration information for external applications stored separately (e.g., in a configuration database) from the NOS for the network device, handling and management of the external applications is deterministically performed even with a firmware upgrade (e.g., a NOS upgrade) is to be performed for the network device. NOS upgrades do not affect the configuration information stored for the external applications. Accordingly, even when the network device has been upgraded to a new NOS, the DCM and ALM daemons in the new NOS firmware can use the configuration information stored in the configuration database for the external applications to identify the external applications and how the external applications are to be handled by the ALM framework.

Additionally, the ALM framework does not impose any restrictions on the nature of the external applications or how the external applications are developed. The ALM framework is open and flexible to accommodate different types of external applications, programmed using different languages or techniques, or using different development platforms (e.g., there is no restriction on an external application being developed using a particular language of SDK (software development kit)). Further, while an external application is executed by a management module (or in the control plane of a network device), the external application itself can perform processing related to the data plane or for the control plane or some other function. There are no limitations imposed on the functionalities of the external application. An external application can be any executable program, including but not limited to an executable binary image, a shell script, a Perl progam, a Java program, a C or C++ program, and other executable programs.

In certain embodiments, a Dynamic Host Configuration Protocol (DHCP) server application can be treated as an external application and be handled by the ALM framework described above. DHCP is a client/server protocol that automatically provides an Internet Protocol (IP) host with its IP address and other related configuration information. As described herein, the ALM framework receives configuration information for the DHCP program, launches the DHCP application, and also manages the DHCP application (e.g., provide high availability support, for example, to handle failover situations, handle non-responsive or unexpectedly terminated application, etc.).

The embodiment depicted in FIG. 1 and described above pertains to a chassis system where the management modules are implemented on one or two separate cards. This however is not intended to be limiting. The teachings described herein can also be implemented in a "pizza-box" system comprising one or more processors and executing programs that provide the functionality of the management modules. For example, in a pizza-box system, the active management module may be executed as a first process and the standby management module may be executed as a different process by the same or different processors. In some embodiments, the active management module may be implemented by a first virtual machine and the standby management module may be implemented by a second virtual machine. The ALM framework described herein may be provided in such a pizza-box environment.

In certain embodiments, a non-transitory machine-readable or computer-readable medium is provided for storing data and code (instructions) that provides the ALM framework capabilities described above. The data and code can be executed by one or more processors. Examples of non-transitory machine-readable or computer-readable medium include memory disk drives, Compact Disks (CDs), optical drives, removable media cartridges, memory devices, and the like. A non-transitory machine-readable or computer-readable medium may store the basic programming (e.g., instructions, code, program) and data constructs, which when executed by one or more processors, provide the functionality described above. In certain implementations, the non-transitory machine-readable or computer-readable medium may be included in a network device and the instructions or code stored by the medium may be executed by one or more processors of the network device causing the network device to perform certain functions described above. In some other implementations, the non-transitory machine-readable or computer-readable medium may be separate from a network device but can be accessible to the network device such that the instructions or code stored by the medium can be executed by one or more processors of the network device causing the network device to perform certain functions described above. The non-transitory computer-readable or machine-readable medium may be embodied in non-volatile memory or volatile memory.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

Although specific embodiments have been described, various modifications, alterations, alternative constructions, and equivalents are also encompassed within the scope of described embodiments. Embodiments described herein are not restricted to operation within certain specific data processing environments, but are free to operate within a plurality of data processing environments. Additionally, although certain implementations have been described using a particular series of transactions and steps, it should be apparent to those skilled in the art that these are not meant to be limiting and are not limited to the described series of transactions and steps. Although some flowcharts describe operations as a sequential process, many of the operations can be performed in parallel or concurrently. In addition, the order of the operations may be rearranged. A process may have additional steps not included in the figure.

Further, while certain embodiments have been described using a particular combination of hardware and software, it should be recognized that other combinations of hardware and software may also be provided. Certain embodiments may be implemented only in hardware, or only in software (e.g., code programs, firmware, middleware, microcode, etc.), or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A network device comprising:
   a set of one or more processors;
   a set of ports for receiving or forwarding packets;
   wherein a first processor from the set of processors is configured to execute, as part of a network operating system (NOS) of the network device, an application launcher and management framework (ALM);
   wherein the ALM is configured to:
     receive information identifying an application to be executed by the network device, the application being a third-party application;
     receive configuration information for the application, the configuration information identifying a condition for launching the application, the condition related to a state of a command line interface (CLI) of the network device or a state of the set of ports of the network device;
     monitor the network device to determine a current state;

determine, based at least on the current state of the network device, if the condition is satisfied; and
cause the application to be executed by the network device upon determining that the condition is satisfied, wherein a second processor from the set of processors is configured to
determine a first state associated with the network device upon determining that a failover has occurred; and
cause the application to be re-launched in response to determining that the first state is associated with the network device.

2. The network device of claim 1 wherein:
the configuration information for the application identifies a first action to be performed when the application enters a first application state; and
the ALM is further configured to:
monitor the application executed by the network device;
determine that the application has entered the first application state; and
responsive to determining that the application has entered the first application state, cause the first action to be performed.

3. The network device of claim 2 wherein:
the first application state is a state where the application is non-responsive or has terminated unexpectedly; and
the first action is to restart the application on the network device.

4. The network device of claim 1 wherein:
the configuration information identifies an action to be performed when a second state is associated with the network device; and
the ALM is further configured to:
monitor one or more states of the network device to determine if the second state is associated with the network device; and
responsive to determining that the second state is associated with the network device, cause the action to be performed.

5. The network device of claim 4 wherein:
the second state associated with the network device is a state indicating a power down condition for the network device; and
the action is writing application data the application to a persistent.

6. The network device of claim 1, wherein the information identifying the application and the configuration information for the application are received via a command line interface (CLI) provided by the network device.

7. The network device of claim 1, wherein the condition is related to the state of the set of ports of the network device.

8. The network device of claim 1, the ALM is further configured to cause the application to be executed within the NOS upon determining that the condition is satisfied.

9. A computer-implemented method comprising:
receiving, by an application launcher and management framework (ALM) information identifying an application to be executed by a network device, the application being a third party application and the ALM being a part of a network operating system (NOS) of the network device;
receiving, by the ALM, configuration information for the application, the configuration information identifying a condition for launching the application, the condition related to a state of a command line interface (CLI) of the network device or a state of a set of ports of the network device;
monitoring, by the ALM, the network device to determine a current state;
determining, by the ALM, based at least on the current state of the network device, if the condition is satisfied;
causing the application to be executed by the network device upon determining that the condition is satisfied;
determining, by a processor of a set of processors of the network device, a first state associated with the network device upon determining that a failover has occurred; and
causing, by the processor, the application to be re-launched in response to determining that the first state is associated with the network device.

10. The computer-implemented method of claim 9, wherein the condition is related to the state of the CLI of the network device.

11. The computer-implemented method of claim 9 wherein the configuration information for the application identifies a first action to be performed when the application enters a first application state; and the computer-implemented method further comprising:
monitoring the application executed by the network device;
determining that the application has entered the first application state; and
responsive to determining that the application has entered the first application state, causing the first action to be performed.

12. The computer-implemented method of claim 11, wherein the first application state is a state where the application is non-responsive or has terminated unexpectedly; and
the first action is to restart the application on the network device.

13. The computer-implemented method of claim 9, wherein the configuration information identifies an action to be performed when a second state is associated with the network device; and the computer-implemented method further comprising:
monitoring the network device to determine if the second state is associated with the network device; and
responsive to determining that the second state is associated with the network device, cause the second action to be performed.

14. The computer-implemented method of claim 13, wherein the second state associated with the network device is a state indicating a power down condition for the network device; and
the action is writing application data the application to a persistent memory of the network device.

15. A system comprising:
one or more processors;
a memory coupled to the one or more processors, the memory storing a plurality of instructions executable by the one or more processors, the plurality of instructions comprising instructions that when executed by the one or more processors cause at least a first processor of the one or more processors to execute, as part of a network operating system (NOS) of the system, an application launcher and management framework (ALM), and to perform processing comprising:
receiving information identifying an application to be executed by a network device, the application being a third-party application;

receiving the configuration information identifying a condition for launching the application, the condition related to a state of a command line interface (CLI) of the system or a state of a set of ports of the system;

monitoring the system to determine a current state;

determining, based at least on the current state of the system if the condition is satisfied; and causing the application to be executed by the system upon determining that the condition is satisfied, wherein a second processor from the set of processors is configured to determine a first state associated with the system device upon determining that a failover has occurred; and cause the application to be re-launched in response to determining that the first state is associated with the system.

\* \* \* \* \*